(12) United States Patent
Rajendran et al.

(10) Patent No.: US 8,824,977 B2
(45) Date of Patent: Sep. 2, 2014

(54) USING A SAME ANTENNA FOR SIMULTANEOUS TRANSMISSION AND/OR RECEPTION BY MULTIPLE TRANSCEIVERS

(75) Inventors: Gireesh Rajendran, Trivandrum (IN); Apu Sivadas, Bangalore (IN); Yogesh Darwhekar, Bangalore (IN); Vivek Dham, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 490 days.

(21) Appl. No.: 13/083,598

(22) Filed: Apr. 11, 2011

(65) Prior Publication Data

US 2012/0258660 A1     Oct. 11, 2012

(51) Int. Cl.
  *H04B 5/00*     (2006.01)
  *H04B 1/46*     (2006.01)
  *H04M 1/00*     (2006.01)
  *H01Q 7/00*     (2006.01)
  *H04B 1/00*     (2006.01)

(52) U.S. Cl.
  CPC .......... *H04B 5/0081* (2013.01); *H04B 1/0053* (2013.01); *H01Q 7/00* (2013.01); *H04B 5/0031* (2013.01)
  USPC ....................... 455/82; 455/41.1; 455/550.1

(58) Field of Classification Search
  CPC ........ H04B 1/005; H04B 1/0053; H04B 5/00; H01Q 7/00
  USPC ............. 455/41.1, 41.2, 47, 66.1, 500, 88, 455/550.1, 552.1, 553.1, 90.2, 90.3; 340/10.1, 12.52, 12.53
  See application file for complete search history.

(56) References Cited

U.S. PATENT DOCUMENTS

| | | | | |
|---|---|---|---|---|
| 6,515,628 | B2 * | 2/2003 | Roberts ................. | 343/700 MS |
| 7,084,815 | B2 * | 8/2006 | Phillips et al. ......... | 343/700 MS |
| 8,350,771 | B1 * | 1/2013 | Zaghloul et al. ............ | 343/769 |
| 8,390,519 | B2 * | 3/2013 | Wang et al. ........... | 343/700 MS |
| 2008/0036678 | A1 * | 2/2008 | Park et al. ..................... | 343/866 |
| 2008/0233868 | A1 | 9/2008 | Rofougaran et al. | |
| 2008/0233874 | A1 * | 9/2008 | Rofougaran et al. ........ | 455/41.2 |
| 2010/0090909 | A1 * | 4/2010 | Ella ............................... | 343/702 |
| 2011/0243120 | A1 * | 10/2011 | Ginsburg et al. ............. | 370/345 |
| 2012/0214409 | A1 * | 8/2012 | Tzoreff et al. ................ | 455/41.1 |
| 2013/0023223 | A1 * | 1/2013 | Rofougaran et al. ......... | 455/205 |

* cited by examiner

*Primary Examiner* — Andrew Wendell
(74) *Attorney, Agent, or Firm* — Lawrence J. Bassuk; Frederick J. Telecky, Jr.

(57) ABSTRACT

A circuit includes an antenna, and a pair of transceivers. A first transceiver in the pair is connected to the antenna via a first pair of feed-points, and is designed to transmit and receive signals in a first band of frequencies. A second transceiver in the pair is connected to the antenna via a second pair of feed-points, and is designed to transmit and receive signals in a second band of frequencies. The first band and the second band are non-overlapping frequency bands. The first pair of feed-points is located at a voltage null point of the antenna with respect to the second pair of feed-points. The second pair of feed-points is located at a voltage null point of the antenna with respect to the first pair of feed-points. The first transceiver and the second transceiver are, thus, enabled to simultaneously transmit and/or receive corresponding signals using the same antenna.

18 Claims, 4 Drawing Sheets

United States Patent US 8,824,977 B2

USING A SAME ANTENNA FOR SIMULTANEOUS TRANSMISSION AND/OR RECEPTION BY MULTIPLE TRANSCEIVERS

BACKGROUND

1. Technical Field

Embodiments of the present disclosure relate generally to antennas, and more specifically to using a same antenna for simultaneous transmission and/or reception by multiple transceivers.

2. Related Art

Transceivers are often used for transmission and reception of information in the form of corresponding modulated signals, and contain both a transmitter portion and a receiver portion. The transmission and/or reception of the signals may take place through a wireless medium, and accordingly, a transceiver may employ an antenna for the transmission and/ or reception.

It is often desirable to use a same (common) antenna for multiple transceivers to reduce implementation area and cost. Further, it may be desirable to enable simultaneous transmission and/or reception by the multiple transceivers using the same antenna. Simultaneous transmission and/or reception refer to transmission and/or reception in a same (or at least partially overlapping) time interval. For example, assuming a scenario in which two transceivers use a same antenna, simultaneous transmission and/or reception means that each of the two transceivers may transmit in a same (or partially overlapping) time interval, or each of the two transceivers may receive in a same (or partially overlapping) time interval, or one of the transceivers transmits while the other receives in the same (or overlapping) time interval.

Each of the multiple transceivers using the same antenna may be designed to transmit and receive correspondingly different types of modulated signals. For example, considering two transceivers, one of the transceivers may be designed to transmit and receive near-field communication (NFC) signals, while the other may be designed to transmit and receive frequency modulated (FM) signals.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A circuit includes an antenna, and a pair of transmitters. A first transmitter in the pair is connected to the antenna via a first pair of feed-points, and is designed to transmit signals via the antenna in a first band of frequencies. A second transmitter in the pair is connected to the antenna via a second pair of feed-points, and is designed to transmit signals via the antenna in a second band of frequencies. The first band and the second band are non-overlapping frequency bands. The first pair of feed-points is located at a voltage null point of the antenna with respect to the second pair of feed-points. The second pair of feed-points is located at a voltage null point of the antenna with respect to the first pair of feed-points. Both of the first transmitter and the second transmitter are thus enabled to simultaneously transmit corresponding signals via the antenna.

The circuit further includes a pair of receivers. A first receiver in the pair is connected to the antenna via the first pair of feed-points, and is designed to receive signals via the antenna in the first band of frequencies. A second receiver in the pair is connected to the antenna via the second pair of feed-points, and is designed to receive signals via the antenna in the second band of frequencies. The first transmitter and the first receiver are included in a first transceiver, and the second transmitter and the second receiver are included in a second transceiver. Simultaneous transmission and/or reception via the antenna by the two transceivers are thus enabled.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
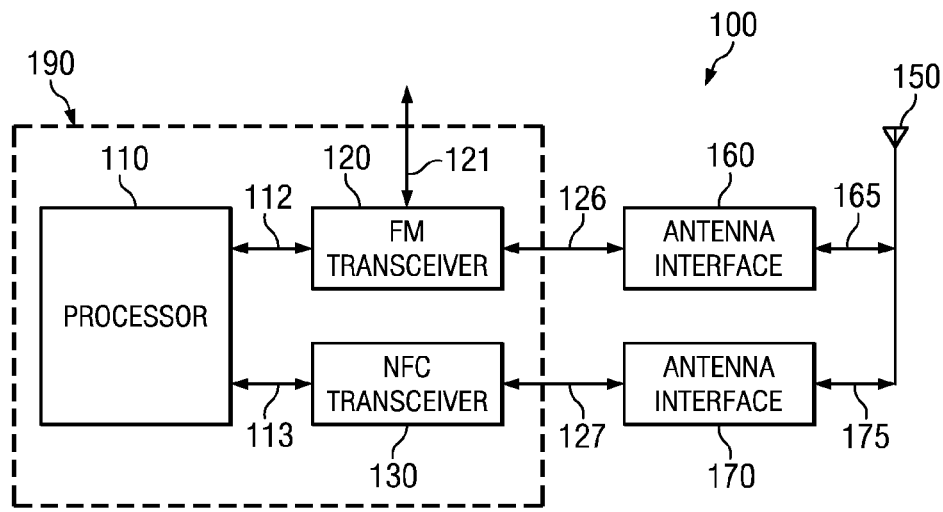
FIG. 1 is a block diagram illustrating the details of an example device in which several embodiments can be implemented.

FIG. 1 is a block diagram of an example device in which several embodiments of the present disclosure can be implemented. The diagram shows device 100 containing integrated circuit (IC) 190, antenna interface 160, antenna interface 170 and antenna 150. IC 190 is shown containing processor 110, frequency modulation (FM) transceiver 120, and near-field communication (NFC) transceiver 130. The specific blocks of device 100 are shown merely by way of illustration, and typical implementations of device may contain more or fewer blocks.

FM transceiver 120 operates to transmit and receive FM signals. FM transceiver 120 generates and provides FM signals to antenna 150 via path 126, antenna interface 160 and path 165. FM transceiver 120 receives FM signals from antenna 150 also via path 165, antenna interface 160 and path 126. FM transceiver demodulates the information contained in a received FM signal, and provides the demodulated signal on path 121, which may be connected to a speaker, not shown. Alternatively, the demodulated signal may be forwarded by FM transceiver 120 on path 112, and converted from analog form to digital form by an analog to digital converter (ADC) not shown (but which may be additionally implemented in IC 190 and located in the signal path between processor 110 and FM transceiver 120), and the data thus obtained may be processed by processor 110. FM transceiver 120 may receive an input (baseband) signal from a microphone connected to path 121, and operates to modulate a carrier by the baseband signal, to generate an FM signal. Alternatively, processor 110 may forward internally-generated data to a digital to analog converter (DAC), not shown, but implemented in IC 190 and located in the signal path between processor 110 and FM transceiver 120. The DAC may convert the data to analog form, and provide the analog signal, thus generated, to FM transceiver 120. FM transceiver 120 may contain corresponding circuits required for its operation, and such circuits may include FM modulator, FM demodulator, filters, power amplifiers, etc. Currently, FM communication is standardized and designed to operate within 76 MHz to 108 MHz band globally.

NFC transceiver 130 operates to transmit and receive NFC signals. As is well-known in the relevant arts, near field communication (NFC) generally refers to short range (of the order of a few centimeters) wireless communication technology that enables exchange of data between two or more near-field communication devices, typically by inductive coupling. Inductive coupling refers to the generation of voltage/current in one coil due to (and proportional to) a change in voltage/current (and hence the corresponding magnetic field) in another coil, the two coils being termed as being "inductively coupled" to each other (and which may thus be viewed as 'antennas'). Currently, NFC communication is standardized and designed to operate within the globally available and unlicensed radio frequency ISM band of 13.56 MHz. The specific modulation technology used in NFC may include amplitude-shift keying (ASK). The band of frequencies of NFC signals and FM signals do not overlap with respect to each other.

NFC transceiver 130 generates and provides NFC signals to antenna 150 via path 127, antenna interface 170 and path 175. NFC transceiver 130 receives NFC signals from antenna 150 also via path 175, antenna interface 170 and path 127. NFC transceiver 130 demodulates the information contained in a received NFC signal, and provides the corresponding data obtained by the demodulation on path 113 to processor 110. NFC transceiver receives data from processor 110 on path 113 and generates corresponding NFC signals. NFC transceiver 120 may contain corresponding circuits required for its operation, and such circuits may include FM modulator, FM demodulator, filters, power amplifiers, etc.

Processor 110 generates data to be transmitted by FM transceiver 120 and NFC transceiver 130. Similarly, processor 110 operates on data received from FM transceiver 120 and NFC transceiver 130 to provide corresponding features of device 100.

Antenna interfaces 160 and 170 may contain components that may be required to prevent each of FM transceiver 120 and NFC transceiver 130 from affecting or being affected by the transmission or reception of the corresponding signal by the other. Antenna 150 is designed to transmit and receive both FM and NFC signals. Dimensions and the specific implementation type of antenna 150 may be chosen based on the specific frequencies (or band of frequencies) that need to be transmitted or received. In the specific example of FIG. 1, antenna 150 is implemented as a wideband antenna to enable transmission and reception of both NFC as well as FM signals.

Antenna 150, in conjunction with antenna interfaces 160 and 170, is designed to permit simultaneous transmission and/or reception of NFC and FM signals. An embodiment of antenna 150 and antenna interfaces 160 and 170 is described next.

2. Antenna Configuration

Figure 2:
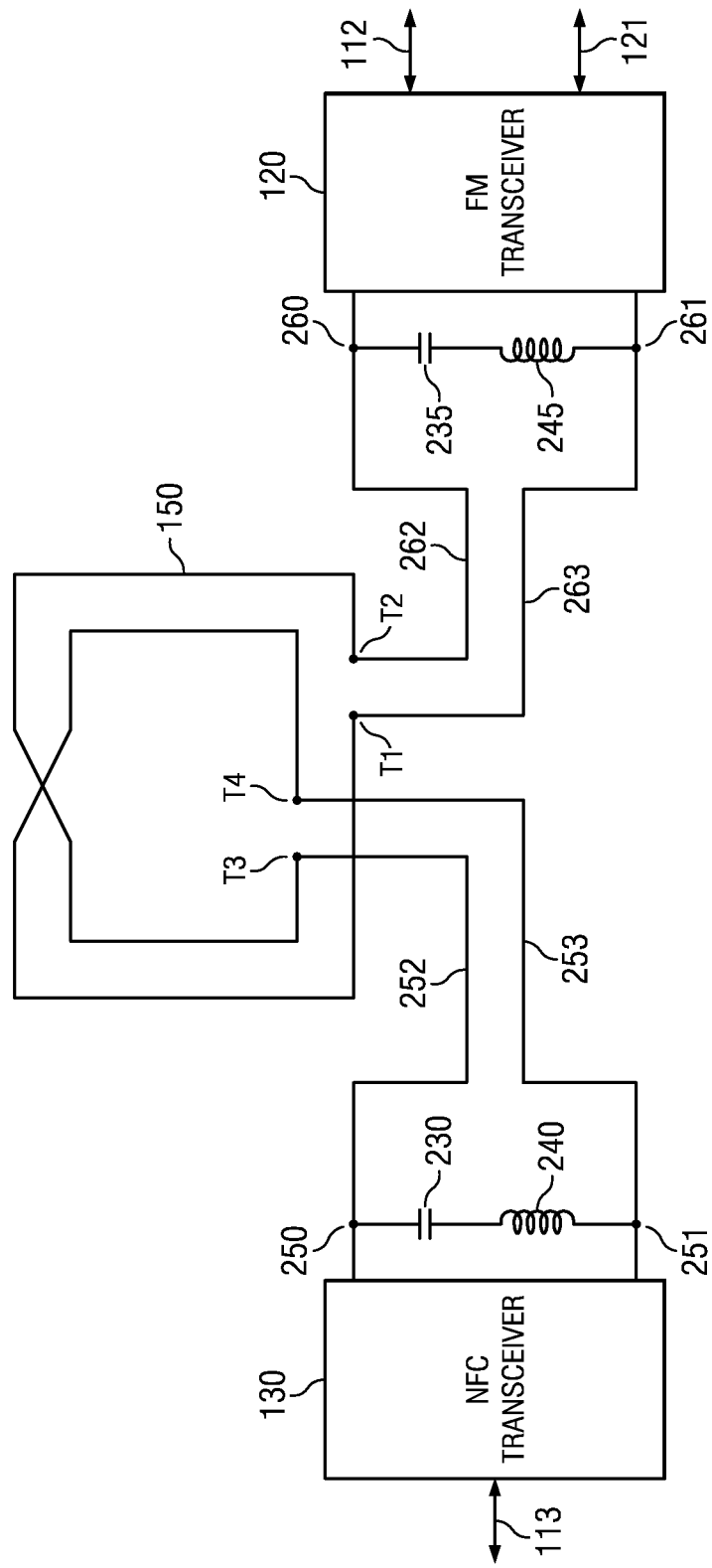
FIG. 2 is a block diagram illustrating the manner in which a same antenna is used for simultaneous transmission and/or reception by two transceivers, in an embodiment.

FIG. 2 is a block diagram illustrating the manner in which a same antenna is used for simultaneous transmission and/or reception by two transceivers, in an embodiment. FIG. 2 is shown containing FM transceiver 120 and NFC transceiver 130 of FIG. 1, loop antenna 150, capacitors 230 and 235 and inductors 240 and 245. Paths or terminals 250 and 251 collectively correspond to path 127. Paths or terminals 260 and 261 collectively correspond to path 126.

Loop antenna 150 is shown as a 2-turn loop antenna. However, loop antenna 150 may be implemented with fewer or more number of turns also. FM transceiver 120 is connected to antenna 150 at antenna tap points (or feed-points) T1 and T2. NFC transceiver 130 is connected to antenna 150 at antenna tap points (feed-points) T3 and T4. As is well known, a feed-point/tap point refers to a node location where a signal connection is made to an antenna.

Tap points T1 and T2 are located at (or very close to) the geometric centre-point of antenna 150 as viewed from tap points T3 and T4. Tap points T3 and T4 are thus located at (or very close to) the geometric centre-point of antenna 150 as viewed from tap points T1 and T2. The term 'geometric center point' or center-tap is illustrated more clearly in FIG. 3A, which shows a single-turn loop antenna.

Figure 3A:
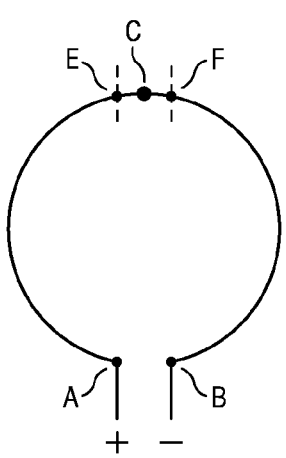
FIGS. 3A and 3B are diagrams used to illustrate the geometric centre-point of a loop antenna.

The single-turn loop-antenna of FIG. 3A has feed-points at A and B, i.e., a differential signal (such as, for example, the output of FM transceiver 120 or NFC transceiver 130) is fed across points A and B. Point C is located at the geometric mid-point of the loop antenna as viewed from points A and B, and is also referred to as the centre-tap of the loop. FIG. 3C illustrates the voltage variations of the loop traversing from point A (or B) to point C. In traversing from point A (or B), the voltage changes from a maximum Vmax (at A or B) to 0 at C. Thus, as is well known in the relevant arts, point C at which the voltage becomes zero is referred to as voltage null point with respect to A and B.

Hence, if another output signal could be fed at point C, then the voltage applied across points A and B would not affect the transmitter or receiver 'connected' to point C. In practice, for feeding a differential signal, two points are required. If the loop is cut at two points very close to C, such as for example, points E and F, then only a negligible differential voltage exists across points E and F due to the voltage fed across points A and B. Thus, the voltage between points E and F due to a signal fed across A and B being negligible or substantially zero, for practical purposes feed-points E and F may be viewed as being located at a voltage null point of the antenna with respect to feed-points A and B.

Before disconnecting point E from point F (by cutting the loop portion between points E and F), a signal fed across points A and B would have 'seen' a low impedance between points E and F. To ensure that such low impedance is maintained after cutting the loop between points E and F, a network that offers low impedance at a frequency same as that of the signal fed across points A and B is connected between E and F, implemented using a series LC circuit. The low impedance path thus implemented between points E and F provides additional isolation, from a transceiver connected to A and B, for a transceiver connected to points E and F. Referring to FIG. 2, assuming feed-points T1 and T2 correspond to points A and B of FIG. 3B, and feed-points T3 and T4 correspond to points E and F, the LC circuit formed by the combination of inductor 240 and capacitor 245 (and connected between T3 and T4) represents a network that offers low impedance (due to series resonance) at a frequency of the signal fed across points T1 and T2. Similarly, the LC circuit formed by the combination of inductor 245 and capacitor 235 (and connected between T1 and T2) represents a network that offers low impedance (due to series resonance) at a frequency of the signal fed across points T3 and T4.

Figure 3B:
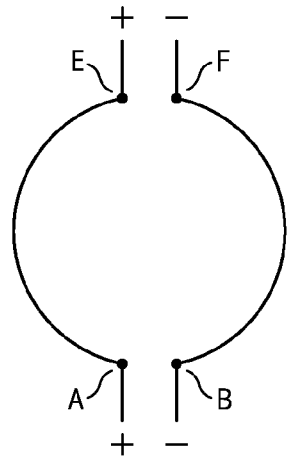
Figure 3C:
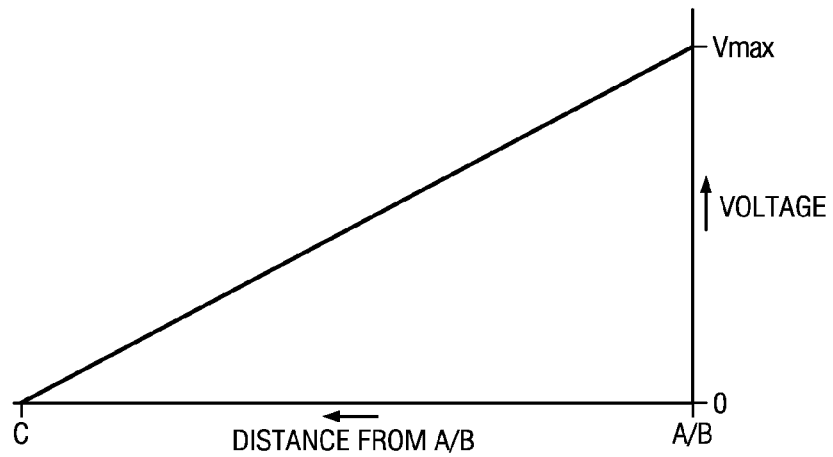
FIG. 3C is a graph illustrating the variations of voltage values on a portion of a loop antenna.

As illustrated in FIG. 3B, if points A and B are located close to the geometric mid-point of the loop as viewed from points E or F, then feed-points A and B may be viewed as being located at a voltage null point of the antenna with respect to feed-points E and F. Thus, a differential signal fed to feed-points E and F would not affect the transmitter or receiver connected to feed-points A and B.

Referring again to FIG. 2, feed-points T1 and T2 are located at the voltage null-point of loop antenna 150 as viewed from feed-points T3 and T4. Similarly, feed-points T3 and T4 are located at the voltage null-point of loop antenna 150 as viewed from feed-points T1 and T2. Hence, NFC transceiver 130 and FM transceiver 120 are connected to antenna 150 at the voltage null of each other. Therefore, NFC transceiver 130 neither loads, nor is affected by, the output of FM transceiver 120. Similarly, FM transceiver 120 neither loads, nor is affected by, the output of NFC transceiver 130. Thus, simultaneous transmission and/or reception by each of FM transceiver 120 and NFC transceiver 130 can be performed using antenna 150.

It is noted here that while FIG. 2 is described with specific reference to an NFC transceiver and an FM transceiver, other types of transceivers can also be used instead. However, the transmission (and reception) frequency-bands of the two transceivers may need to be non-overlapping.

The series LC circuit formed by capacitor 230 and inductor 240 is designed to offer low impedance in the FM band (the band of frequencies on which FM transceiver 120 transmits and/or receives), and behaves as a capacitive impedance in the NFC band (the band of frequencies on which NFC transceiver 130 transmits and/or receives). The series LC circuit formed by capacitor 235 and inductor 245 is designed to offer low impedance in the NFC band, and behaves as an inductance in the FM band.

In FIG. 2, the combination of capacitor 230 and inductor 240 represents antenna interface 170 (FIG. 1), while the combination of capacitor 235 and inductor 245 represents antenna interface 160 (FIG. 1). The combination of inductor 240 and capacitor 230 represents a tuned circuit tuned to the FM band. The combination of inductor 245 and capacitor 235 represents a tuned circuit tuned to the NFC band. The pair of paths 252 and 253 collectively represents path 175 (FIG. 1), and the pair of paths 262 and 263 collectively represents path 165 (FIG. 1).

Figure 4:
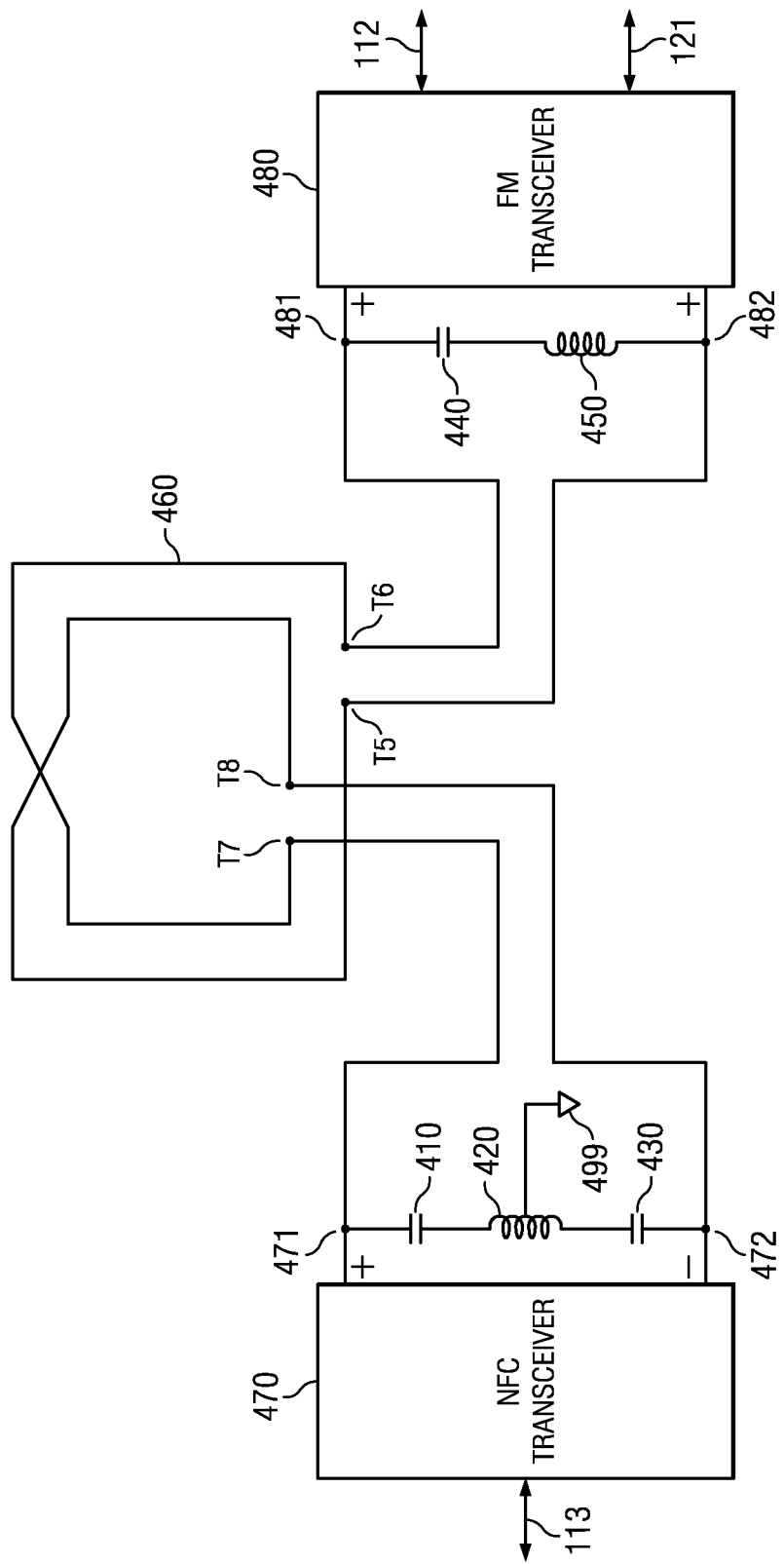
FIG. 4 is a block diagram illustrating the manner in which a same antenna is used for simultaneous transmission and/or reception by two transceivers, in an alternative embodiment.

FIG. 4 is a block diagram illustrating the manner in which a same antenna is used for simultaneous transmission and/or reception by two transceivers, in an alternative embodiment. The diagram is shown containing NFC transceiver 470, FM transceiver 480, loop antenna 460, capacitors 410, 430 and 440 and inductors 420 and 450.

NFC transceiver 470 is a differential transceiver as indicated by the + and − signs at output nodes 471 and 472 respectively. FM transceiver 480 is a single-ended transceiver as indicated by the + sign at each of nodes 481 and 482. The ground (or return 499) terminal for FM transceiver 480 is provided at the centre tap of inductor 420. NFC transceiver 470 is connected to antenna 460 at feed-points T7 and T8. FM transceiver 480 is connected to antenna 460 at feed-points T5 and T6.

Feed-points T7 and T8 are located at the voltage null-point of loop antenna 460 as viewed from feed-points T5 and T6. Similarly, feed-points T5 and T6 are located at the voltage null-point of loop antenna 460 as viewed from feed-points T7 and T8. Hence, NFC transceiver 470 and FM transceiver 480 are connected to antenna 460 at the voltage null of each other, thereby allowing simultaneous transmission and/or reception by NFC transceiver 470 and FM transceiver 480 using antenna 460.

The capacitances of capacitors 410 and 430 and the inductance of inductor 420 are selected such that the series connection of capacitors 410 and 430 and inductor 420 offers a low impedance in the FM band and behaves as a capacitive impedance in the NFC band. The capacitance of capacitor 440 and the inductance of inductor 450 are selected such that the series connection of capacitor 440 and inductor 450 offers low impedance in the NFC band and behaves as an inductive impedance in the FM band. Thus, additional isolation is provided similar to that in FIG. 2. The combination of inductor 420 and capacitors 410 and 430 represents a tuned circuit tuned to the FM band. The combination of inductor 450 and capacitor 440 represents a tuned circuit tuned to the NFC band.

While in FIG. 4, NFC transceiver 470 is shown as being designed to process differential signals, while FM transceiver 480 is shown as designed to process single ended signals, in an alternative embodiment, NFC transceiver 470 may be designed to process single-ended signals, and FM transceiver 480 designed to process differential signals. In such an alternative embodiment, the ground terminal for NFC transceiver 470 may be provided at the centre tap of inductor 450 and an additional capacitor may be connected between inductor 450 and path 482. In addition, the ground connection at centre-tap of inductor 420 as well as one of capacitors 410 and 420 may be removed. The ground connection at the center-tap of the corresponding inductors may be viewed as being provided at the center-point of the (corresponding) tuned circuit. Thus, the ground connection at the center-tap of inductor 420 may be viewed as being at the center-point of the tuned circuit formed by capacitor 410, inductor 420 and capacitor 430.

Figure 5:
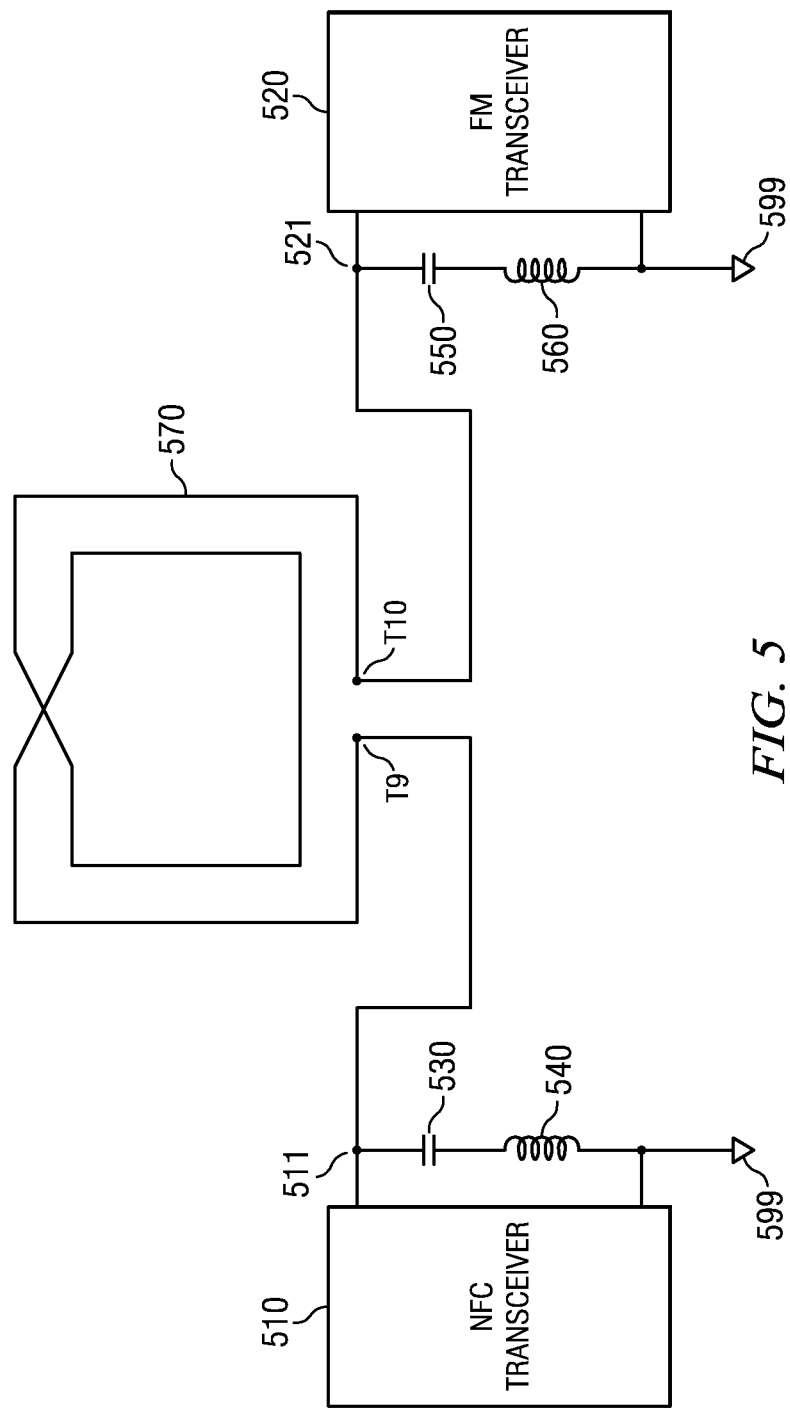
FIG. 5 is a block diagram illustrating the manner in which a same antenna is used for simultaneous transmission and/or reception by two transceivers, in yet another embodiment.

FIG. 5 is a block diagram illustrating the manner in which a same antenna is used for simultaneous transmission and/or reception by two transceivers, in yet another embodiment. The diagram is shown containing NFC transceiver 510, FM transceiver 520, loop antenna 570, capacitors 530 and 550, and inductors 540 and 560. The combination of inductor 540 and capacitor 530 represents a tuned circuit tuned to the FM band. The combination of inductor 560 and capacitor 550 represents a tuned circuit tuned to the NFC band.

Each of NFC transceiver 510 and FM transceiver 520 is designed to transmit and receive single-ended signals via antenna 570, as indicated by the ground (599) connections at the respective output terminals. Unlike, the technique of FIGS. 2 and 4, antenna 570 has a single pair of feed-points (T9 and T10). One of the terminals of NFC transceiver 510 is connected to feed-point T9, while the other terminal of NFC transceiver 510 is connected to ground (599). One of the terminals of FM transceiver 520 is connected to feed-point T10, while the other terminal of FM transceiver 520 is connected to ground (599). The LC circuit formed by capacitor 530 and inductor 540 is designed to offer low impedance in the FM band, and to behave as a capacitive impedance in the NFC band. The LC circuit formed by capacitor 550 and inductor 560 is designed to offer low impedance in the NFC band, and to behave as an inductive impedance in the FM band. The use of the two LC circuits noted above enables antenna 570 to be used for simultaneous transmission and/or reception of NFC as well as FM signals.

While multiple transceivers are described above as being enabled to transmit and/or receive corresponding signals via a same antenna, it may be appreciated that the transceivers can be replaced by transmitters and/or receivers as well. Thus, the techniques described above can be used in general with multiple transmitters or multiple receivers, or a combination of transmitters and receivers also. In the illustrations of FIGS. 1, 2, 4 and 5, although terminals/nodes are shown with direct connections to various other terminals, it should be appreciated that additional components (as suited for the specific environment) may also be present in the path, and accordingly the connections may be viewed as being electrically coupled to the same connected terminals. In the instant application, power and ground terminals are referred to as constant reference potentials.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A circuit comprising:
    an antenna;
    a first transmitter to transmit signals in a first band of frequencies via the antenna, wherein the first transmitter is coupled to the antenna via a first pair of feed-points; and
    a second transmitter to transmit signals in a second band of frequencies via the antenna, wherein the first band and the second band are non-overlapping frequency bands, wherein the second transmitter is coupled to the antenna via a second pair of feed-points, wherein the first pair of feed-points is located at a voltage null point of the antenna with respect to the second pair of feed-points, and wherein the second pair of feed-points is located at a voltage null point of the antenna with respect to the first pair of feed-points.

2. The circuit of claim 1, further comprising:
    a first receiver to receive signals in the first band of frequencies via the antenna, wherein the first receiver is coupled to the antenna via the first pair of feed-points; and
    a second receiver to receive signals in the second band of frequencies via the antenna, wherein the second receiver is coupled to the antenna via the second pair of feed-points, wherein the first transmitter and the first receiver are comprised in a first transceiver, and wherein the second transmitter and the second receiver are comprised in a second transceiver.

3. The circuit of claim 2, wherein each of the first transceiver and the second transceiver is designed to transmit or receive in a same or at least partially overlapping time interval.

4. The circuit of claim 2, wherein the antenna is a multi-loop antenna, wherein the voltage null point of the antenna with respect to the first pair of feed-points is located at the geometric center-point of the antenna viewed from the first-pair of feed points, and wherein the voltage null point of the antenna with respect to the second pair of feed-points is located at the geometric center-point of the antenna viewed from the second-pair of feed points.

5. The circuit of claim 2, further comprising:
    a first tuned circuit coupled between output terminals of the first transceiver, wherein the first tuned circuit is designed to have a series resonant frequency or low impedance at a center-frequency of the second band of frequencies; and
    a second tuned circuit coupled between output terminals of the second transceiver, wherein the second tuned circuit is designed to have a series resonant frequency or low impedance at a center-frequency of the first band of frequencies.

6. The circuit of claim 2, wherein the first transceiver is a near-field communications (NFC) transceiver, and the second transceiver is a frequency modulation (FM) transceiver.

7. The circuit of claim 5, wherein each of the first transceiver and the second transceiver is designed to process differential signals, wherein each of the first pair of feed-points and the second pair of feed-points receives corresponding differential signals.

8. The circuit of claim 5, wherein one of the first transceiver and the second transceiver is designed to process differential signals, while the other one of the first transceiver and the second transceiver is designed to process single-ended signals, wherein, if the second transceiver is designed to process single-ended signals and the first transceiver is designed to process differential signals, a connection to a constant reference potential is provided at a center-point of the first tuned circuit, wherein, if the first transceiver is designed to process single-ended signals and the second transceiver is designed to process differential signals, a connection to a constant reference potential is provided at a center-point of the second tuned circuit.

9. The circuit of claim 1, wherein the antenna is a loop antenna.

10. A device comprising:
    an antenna;
    a processor;
    a first receiver to receive a first receive analog signal in a first band of frequencies from the antenna and to provide corresponding demodulated data to the processor, wherein the first receiver is coupled to the antenna via a first pair of feed-points; and
    a second receiver to receive a second receive analog signal in the second band of frequencies from the antenna and to provide corresponding demodulated data to the processor, wherein the second receiver is coupled to the antenna via a second pair of feed-points, wherein the first band and the second band are non-overlapping frequency bands, wherein the first pair of feed-points is located at a voltage null point of the antenna with respect to the second pair of feed-points, and wherein the second pair of feed-points is located at a voltage null point of the antenna with respect to the first pair of feed-points.

11. The device of claim 10 further comprising:
    a first transmitter to receive data from the processor and to provide a first transmit analog signal in the first band of frequencies to the antenna, wherein the first transmitter is coupled to the antenna via the first pair of feed-points; and
    a second transmitter to receive data from the processor and to provide a second transmit analog signal in the second band of frequencies to the antenna, wherein the second transmitter is coupled to the antenna via the second pair of feed-points, wherein the first transmitter and the first receiver are comprised in a first transceiver, and wherein the second transmitter and the second receiver are comprised in a second transceiver.

12. The device of claim 11, wherein the antenna is a multi-loop antenna, wherein the voltage null point of the antenna with respect to the first pair of feed-points is located at the geometric center-point of the antenna viewed from the first-pair of feed points, and wherein the voltage null point of the antenna with respect to the second pair of feed-points is located at the geometric center-point of the antenna viewed from the second-pair of feed points.

13. The device of claim 12, further comprising:
- a first tuned circuit coupled between the output terminals of the first transceiver, wherein the first tuned circuit is designed to have a series resonant frequency or low impedance at a center-frequency of the second band of frequencies; and
- a second tuned circuit coupled between the output terminals of the second transceiver, wherein the second tuned circuit is designed to have a series resonant frequency or low impedance at a center-frequency of the first band of frequencies.

14. The device of claim 13, wherein the first transceiver is a near-field communications (NFC) transceiver, and the second transceiver is a frequency modulation (FM) transceiver.

15. The device of claim 13, wherein each of the first transceiver and the second transceiver is designed to process differential signals, wherein each of the first pair of feed-points and the second pair of feed-points receives corresponding differential signals.

16. The device of claim 13, wherein one of the first transceiver and the second transceiver is designed to process differential signals, while the other one of the first transceiver and the second transceiver is designed to process single-ended signals, wherein, if the second transceiver is designed to process single-ended signals and the first transceiver is designed to process differential signals, a connection to a constant reference potential is provided at a center-point of the first tuned circuit, wherein, if the first transceiver is designed to process single-ended signals and the second transceiver is designed to process differential signals, a connection to a constant reference potential is provided at a center-point of the second tuned circuit.

17. The device of claim 11, wherein the processor, the first transceiver and the second transceiver are implemented as an integrated circuit (IC).

18. The device of claim 10, wherein the antenna is a loop antenna.

* * * * *